US012203528B2

(12) United States Patent
Hermey et al.

(10) Patent No.: US 12,203,528 B2
(45) Date of Patent: Jan. 21, 2025

(54) LINE-PROTECTING TRANSVERSE BAR FOR AN ENERGY GUIDING CHAIN

(71) Applicant: IGUS GMBH, Cologne (DE)

(72) Inventors: Andreas Hermey, Hennef (DE);
Thilo-Alexander Jaeker, Sankt Augustin (DE); Dominik Barten, Meckenheim (DE)

(73) Assignee: IGUS GMBH, Cologne (DE)

( * ) Notice: Subject to any disclaimer, the term of this patent is extended or adjusted under 35 U.S.C. 154(b) by 232 days.

(21) Appl. No.: 17/759,489

(22) PCT Filed: Jan. 21, 2021

(86) PCT No.: PCT/EP2021/051396
§ 371 (c)(1),
(2) Date: Jul. 26, 2022

(87) PCT Pub. No.: WO2021/151781
PCT Pub. Date: Aug. 5, 2021

(65) Prior Publication Data
US 2023/0125185 A1 Apr. 27, 2023

(30) Foreign Application Priority Data

Jan. 27, 2020 (WO) ................ PCT/EP2020/051954
Jul. 30, 2020 (DE) ..................... 20 2020 104 412.5

(51) Int. Cl.
*F16G 13/16* (2006.01)
*F16L 3/23* (2006.01)
(Continued)

(52) U.S. Cl.
CPC ................ *F16G 13/16* (2013.01); *F16L 3/23* (2013.01); *F16L 3/243* (2019.08); *H02G 11/006* (2013.01)

(58) Field of Classification Search
CPC ... F16G 13/16; F16L 3/24; F16L 3/243; F16L 3/23; H02G 11/006
See application file for complete search history.

(56) References Cited

U.S. PATENT DOCUMENTS 8,459,000 B2    6/2013  Harada
2022/0090651 A1 3/2022  Hermey et al.

FOREIGN PATENT DOCUMENTS

DE    102009030798    4/2010
DE    102012106400    1/2013
(Continued)

OTHER PUBLICATIONS

Translation of DE-202017100200 (Year: 2017).*
(Continued)

*Primary Examiner* — Bobby Yeonjin Kim
(74) *Attorney, Agent, or Firm* — Grossman, Tucker, Perreault & Pfleger, PLLC

(57) ABSTRACT

A transverse bar for a chain link of an energy guiding chain for guiding lines. The transverse bar has an elongate main body comprising a first plastic and at both longitudinal ends a connecting region for connection to the side plates. The main body of the transverse bar has two long narrow sides which each have a holding device for separating bars. Provided on the inside of the main body that faces towards the lines is a line-protecting layer for handling the lines gently and comprising a second plastic which is different from the plastic of the main body and is selected to reduce abrasion upon relative movement between a line and the transverse bar. In that case the line-protecting layer extends from one narrow side to the other and at least predominantly covers over the inside of the main body but leaves uncovered the respective holding device at the one narrow side and at the other narrow side.

12 Claims, 3 Drawing Sheets

(51) Int. Cl.
*F16L 3/24* (2006.01)
*H02G 11/00* (2006.01)

(56) References Cited

FOREIGN PATENT DOCUMENTS

| | | | | |
|---|---|---|---|---|
| DE | 202017100200 U1 * | 3/2017 | ............ | F16G 13/16 |
| EP | 1564438 | 8/2005 | | |
| EP | 1564438 A2 * | 8/2005 | ............ | F16G 13/16 |
| WO | 9954642 | 10/1999 | | |
| WO | 2020152372 | 7/2020 | | |

OTHER PUBLICATIONS

Translation of EP-1564438 (Year: 2005).*
International Search Report from corresponding PCT Appln. No. PCT/EP2021/051396, dated Apr. 12, 2021. 6 pages.
International Preliminary Report on Patentability from corresponding PCT Appln. No. PCT/EP2021/051396, dated May 31, 2022. 9 pages.
3M Product Data Sheet, 5490 PTFE Plastic Film Tape, Manchester, UK, 1996, 2 pages.

* cited by examiner

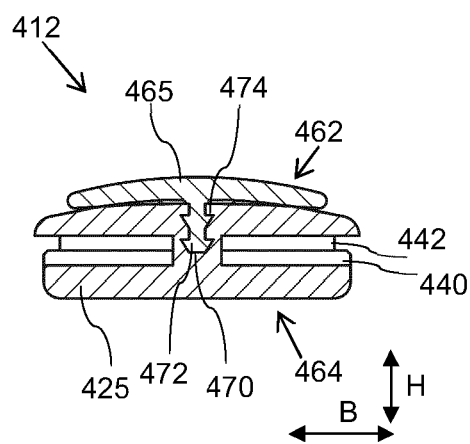
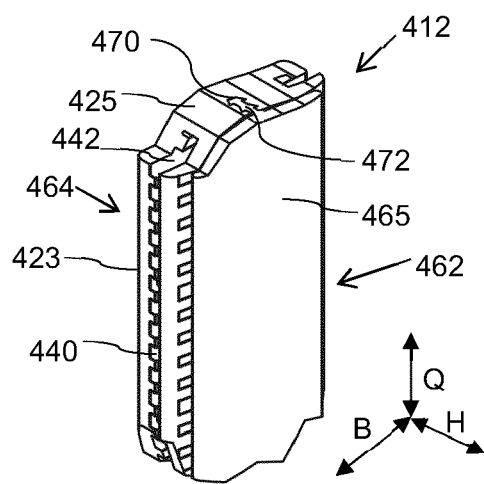
FIG.4A  FIG.4B
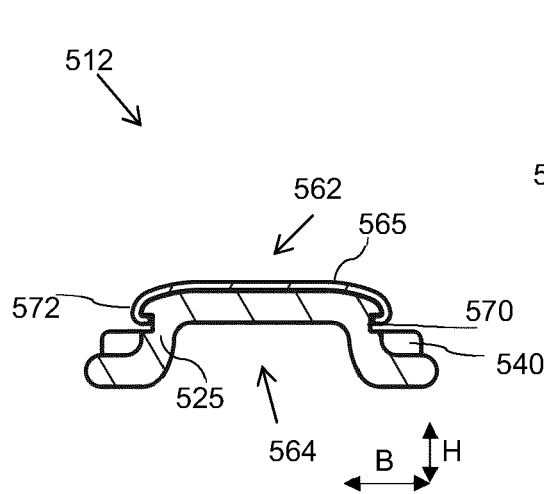
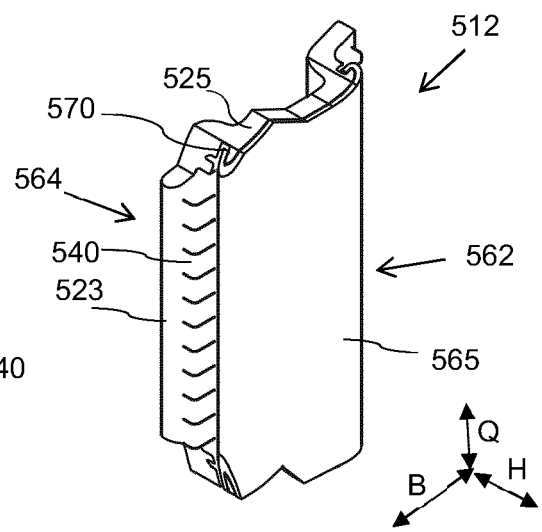
FIG.5A  FIG.5B

LINE-PROTECTING TRANSVERSE BAR FOR AN ENERGY GUIDING CHAIN

FIELD

The invention generally concerns the field of energy guiding chains for protected dynamic guidance of lines like cables, hoses and the like. Energy guiding chains are typically made up of pivotably connected chain links which each have two side plates spaced from each other transversely relative to the longitudinal extent of the energy guiding chain. At least in some of the chain links the side plates are connected together in stable relationship by two transverse bars and define an inner receiving space or guide passage for the lines to be guided. Energy guiding chains typically have two ends which are movable relative to each other and which are respectively connected to a connecting region. A typical energy guiding chain reciprocates between the connecting regions, with the formation of two runs and a direction-changing arc between the runs. The direction of the respective run is reversed in the direction-changing arc.

The invention specifically concerns a transverse bar (also referred to as a transverse member) for a chain link of an energy guiding chain, which serves for connecting side plates and for mounting and holding separating bars.

BACKGROUND

Such a transverse bar usually has an elongate main body of plastic and at each of its longitudinal ends a connecting region for fixing to one of the side plates. The side plates and the transverse bars define the receiving space of the chain link transversely relative to the longitudinal direction of the guided lines.

For internal division the receiving space in the chain link can be divided up by separating bars and shelf portions so that the lines can be guided in an orderly arrangement and do not become entangled. For that purpose, separating bars are typically fitted between the two transverse bars of a chain link parallel to the side plates and are held to at least one of the transverse bars.

The main body of the transverse bar is usually of a plate-like configuration and has two main sides, two long narrow sides which are extended in the longitudinal direction of the transverse bar and two short sides extended in the width direction of the transverse bar. Each of the narrow sides extending in the longitudinal direction of the transverse bar usually has a respective holding device for holding separating bars. Separating bars can in turn hold shelf portions parallel to the transverse bars, for example by fixings to separating bars or through openings in the separating bars, through which shelf portions can extend.

Upon displacement of the energy guiding chain friction in respect of the guided lines against the transverse bars occurs, in particular in the region of the direction-changing arc. For example contact with edges of the plate-like main body of a transverse bar can result in abrasion and wear of the lines being guided. Contact with the surface of the main body which is usually made from fibre-reinforced plastic of considerable hardness can also cause abrasion of the lines, in particular in the case of electric lines which normally have an outer casing comprising a softer plastic.

To protect the guided lines EP 1 564 438 A2 proposed coating the inside surfaces of chain links which can come into contact with lines, inter alia the inside surfaces of transverse bars, with an anti-friction lacquer which is gentle on the lines and which has a friction-reducing effect. EP 1 564 438 A2 however does not disclose how the chain links are constructed, and how various parts of the internal structure are connected together, in particular in view of an additional layer at the surfaces thereof. In addition, a coating process is technically complicated and laborious, for example to provide that a respective coating of equal quality results in relation to various product series.

DE 10 2012 106 400 A1 discloses transverse bars having separate elastically deformable tube elements which are mounted rotatably to the transverse bars and which can act to reduce the wear of the lines being guided. The tube elements however project in the radial direction into the receiving space in the chain link and thereby take up a relatively large amount of space in the internal space, which as a result is not available for the lines to be guided. In addition, transverse bars can only be fixed between the tube elements, that is to say the internal division of the receiving space is limited.

WO 99/054642 (A1) discloses a transverse bar for a typical chain link of an energy guiding chain, which connects two side portions together and has an elongate main body. The main body of the transverse bar in WO 99/054642 has two narrow sides extended in the longitudinal direction of the transverse bar and each having a holding groove suitable for holding transverse bars.

The transverse bar in WO 99/054642 is equipped at its inside with rollers to allow the lines to roll against the transverse bars. A rolling movement admittedly reduces the friction involved, but a structurally complicated configuration with a mounting means for the rotatable rollers on the transverse bar is required for that purpose. That solution also noticeably reduces the space available in the internal space in the chain link.

SUMMARY

An object of the present invention is accordingly to develop a known transverse bar for chain links of energy guiding chains such that it can hold the guided lines in the receiving space in a way to handle the lines as gently as possible and can be produced as simply as possible. The invention aims to permit flexible internal division in the chain links, to be compatible with existing design configurations and/or to be optionally retro-fittable.

In a transverse bar of the general kind, that object is already achieved in that provided on the inside of the main body of the transverse bar, which in intended use is towards the receiving space, is a layer which is gentle on the lines and comprises a second plastic which at least in regard to the composition but in particular in regard to the base material, for example the selected base polymer, is selected to be different from the first plastic, the plastic of the main body, and serves to reduce abrasion in relative movement between a guided line and the transverse bar. The line-protecting layer in that case extends from the one narrow side to the other narrow side of the main body. According to the invention the layer covers the inside of the main body between the narrow sides at least predominantly, preferably substantially completely, but in that respect leaves both holding devices uncovered, that is to say the holding device at the one narrow side and the holding device at the other narrow side.

As the holding device or, when there are a plurality of redundant holding devices, at least one of them, remains uncovered in the case of a transverse bar according to the invention, the respective holding device remains accessible for positively locking and/or force-locking connection to separating bars. The holding region of the holding device at the respective narrow side of the main body preferably remains uncovered in the longitudinal direction of the transverse bar over its entire operative length and is thus freely accessible.

With that configuration existing design configurations, in particular of the separating bars, can be used unchanged and the internal division can be of a flexible nature and can be subsequently modified as required. The internal division does not have to be adapted to the line-protecting layer or the line-protecting layer does not have to be adapted to the desired internal division.

The second plastic differs from the first plastic, the plastic of the main body, in particular in regard to anti-friction properties like for example the coefficient of friction. The (sliding) friction coefficient of the second plastic under corresponding test conditions, in particular in relation to the outside material of the lines to be guided, is lower than the (sliding) friction coefficient of the first plastic. The reduction in abrasion upon relative movement between a line and the transverse bar is afforded in particular by reduced sliding friction ('sliding in such a way as to be gentle on the lines') of the guided lies against the transverse bar.

The layer which is gentle on the lines is produced in the form of a cohesive continuous layer, in particular in one piece, particularly preferably of a unitary structure in respect of its material, in particular as a component or moulding which is separate or which can be retro-fitted.

In the case of a loading in accordance with the intended purpose the line-protecting layer can remain immobile relative to the surface of the main body.

The material thickness of the additional line-protecting layer can in that case be markedly less than that of the main body which forms the actual structural component.

The holding device of the transverse bar for holding separating bars can include for example a row of teeth and/or a holding groove at the respective narrow side for positively locking connection to separating bars of a complementary configuration. The line-protecting layer does not extend over the holding devices so that the respective holding device still remains accessible for connection to separating bars. Nonetheless the line-protecting layer can form an edge protection which covers and mitigates problematical edges on the main body.

To provide protection which is as complete as possible for the lines an embodiment provides that the line-protecting layer extends continuously or uninterruptedly in the longitudinal direction between the longitudinal ends or connecting regions and in the width direction from the one narrow side to the other and thus substantially completely covers the inside of the main body, in particular over the full surface area continuously in the width direction and in the longitudinal direction of the transverse bar.

The width direction of the transverse bar corresponds in that respect to the longitudinal extent of a chain link in the chain direction or the direction of the guided lines; the longitudinal direction of the transverse bar corresponds to the transverse direction of a chain link (not of the chain).

The line-protecting layer can preferably be produced in the form of a separate body or a moulding and connected to the main body, in particular releasably. This embodiment permits retro-fitting of the transverse bars with the line-protecting layer and possibly also replacement of the line-protecting layer, for example if wear occurs.

The line-protecting layer can preferably be an attachment component, in particular for retro-fitting as required.

The line-protecting layer can be fixed in the form of an attachment component in positively locking and/or force-locking relationship, in particular by a latching connection on the main body, in particular releasably. The line-protecting layer and the main body can have in particular mutually matching latching elements, for example clip connectors, for clipping the line-protecting layer to the main body. The line-protecting layer and the main body can be of such a configuration that they permit the line-protecting layer to be snap-fitted on to the main body transversely to the main plane. Latching means of a simple configuration which allow manufacturing tolerances, in the case of plastics, permit the line-protecting layer to be quickly fitted on to the main body, even without complicated and laborious alignment of the two parts relative to each other.

The transverse bar and the line-protecting layer can be produced in the form of separate parts, in particular injection mouldings.

The line-protecting layer can preferably bear snugly or in surface flush-mounted relationship against the inside of the main body and in particular can be in the form of a moulding of a shape complementary to the surface configuration of the inside. At the side towards the main body the line-protecting layer can be of a profile complementary to the profile of the inside of the main body. The line-protecting layer can bear fixedly, preferably without play or in flush-mounted relationship, against the main body.

The main body can have at least one fixing region for fixing the line-protecting layer. The line-protecting layer can be in the form of a separate moulding, and in turn can have at least one snap-connection region or latching connection region co-operating with the at least one fixing region of the main body. Alternatively, or in addition, the snap-connection region or latching connection region of the line-protecting layer can co-operate with one of the holding devices that is possibly not required for connection to separating bars.

The co-operation of a fixing region of the main body with a snap-connection region or latching connection region of the line-protecting layer can be produced for example by a snap-fitment connection or a clipping connection.

In an embodiment the fixing region of the main body can include a profile groove or a recess at the inside surface of the main body for receiving a respective complementary projection which is in the form on the line-protecting layer of a snap-connection region or latching connection region, wherein the projection includes at least one region acting in the manner of a barb or snap-engagement hook.

A latching connection by means of a hook region can allow simple connection of the line-protecting layer to the main body, which is secured against displacement, wherein the two parts of the transverse bar in operation of the energy guiding chain are held immobile relative to each other. The recess for the projection can extend like a groove in the longitudinal direction of the transverse bar and can be positioned in any desired manner relative to the transverse direction of the transverse bar.

The arrangement in particular can also have two or more recesses. In that case the projection can extend in the longitudinal direction over a part of the length of the transverse bar and/or a plurality of projections can be distributed along the longitudinal direction, to co-operate with corresponding openings, for example an elongate groove or separate recesses at the inside of the main body. In principle the projections can also be arranged on the main body and the corresponding recesses on the line-protecting layer, that however is not preferred as it should be possible to use the transverse bars or main body even without the line-protecting layer.

In an embodiment which can be combined with the preceding embodiment two end fixing regions for fixing the line-protecting layer to the main body are in the form of a longitudinal groove along a respective narrow side of the main body. They can serve for engagement through a respective edge region of the line-protecting layer. In this embodiment the edge region can be in the form of a snap-connection region or latching connection region. In this case the respective longitudinal groove preferably opens at the end in the width direction of the main body, wherein the respective edge region of the line-protecting layer is preferably of a clamp-shaped, in particular C-shaped cross-section. In that way the line-protecting layer can engage with the respective edge region into the corresponding longitudinal groove. The line-protecting layer can thus be snapped on to the main body, the edge regions thereof latchingly engaging in the longitudinal groove on the main body. An advantage of this embodiment is the robust fixing, for which no additional fixing means are necessary. In addition, the edge regions can inherently afford edge protection, for example by virtue of a rounded external contour.

Instead of a preferred multi-part structure the line-protecting layer can also be connected to the main body in one piece and/or in material-bonded relationship, in particular being injected to the main body. Such a transverse bar can be produced for example using a suitable two-component (2C) injection moulding process or however for example by subsequent injection of the second plastic on to a separately produced main body.

Each holding device of the main body can respectively include a row of teeth at the respective narrow side for producing a positively locking connection to separating bars of a complementary configuration, with teeth which in particular project in the width direction of the transverse bar. In that case each tooth can be of a dimension in the height direction of the transverse bar, that is greater than a dimension of the tooth in the longitudinal direction of the transverse bar.

Alternatively or in addition each holding device of the main body can have a respective holding groove at the respective narrow side of the main body, for positively locking and/or force-locking fixing or connection to separating bars of a complementary configuration, in which case the holding groove can extend in the longitudinal direction of the transverse bar.

The line-protecting layer is preferably provided only at the inside of the main body and between the narrow sides of the main body so that an outward side which is opposite to the inward side and which in the intended operative state of a transverse bar fitted in a chain link faces away from the receiving space in the chain link, is substantially free from the line-protecting layer or is not covered thereby. That preferred embodiment saves on material as the line-protecting layer in this structure is provided only at the inside of the main body, at which the lines to be guided can come into contact with the transverse bar.

Providing the line-protecting layer at one side can be implemented in particular by fixing regions for fixing the line-protecting layer to the main body, which as described above allow a latching connection or a snap connection so that, in spite of the layer being applied on one side, a non-displaceable fixed connection is possible, which does not slip upon contact with lines which are being guided.

The line-protecting layer can preferably include a material which has a wear-reducing, in particular friction-reducing action in comparison with the main body. By virtue of its tribological properties the material can have a wear-reducing, in particular friction-reducing action on the guided lines.

The material of the line-protecting layer can be for example a different thermoplastic material and can be based on a different polymer from the plastic of the main body. While the main body can be produced from typical polyamide which is possibly reinforced or provided with additives the additional line-protecting layer can be made from a polyethylene or a polypropylene or the like. In that case the plastic of the line-protecting layer can be in particular of a different hardness and/or stiffness from the material of the main body so that an abrasion-reducing action is achieved for protecting the guided lines.

The second plastic of the line-protecting layer includes or consists of a base material or a base polymer which particularly preferably is softer or is of a lower hardness (SHORE hardness D or a hardness value in accordance with VDI/VDE 2616) than the plastic (base material) of the main body of the transverse bar. In that case it can possibly be more softly elastic than the plastic of the main body.

The material can preferably be a tribopolymer which includes solid lubricants (particles) embedded in a base polymer like for example HMWPE or UHMWPE. The second plastic can be provided with additives for improving sliding movement like PTFE. In addition other lubricants, for example dispersed waxes and/or oils can also be included. The material however particularly preferably does not require any additional lubrication. The second plastic, like the first plastic, can include fillers in the form of for example fibres or balls, like glass, glass fibre, carbon fibres or aramid for reinforcement purposes.

The foregoing material preferences apply both in respect of the configuration in the form of a separate component and also in the case of one-piece production with the main body, for example by injection in an injection moulding process.

The line-protecting layer is preferably of a material thickness in a direction perpendicular to a main plane of the transverse bar, that is less than the corresponding dimension of the main body. The material thickness of the line-protecting layer can for example be less than or equal to 40% of the corresponding dimension of the main body.

The line-protecting layer in itself can be of a one-piece configuration and can have a surface or sliding surface which in the case of an ordinary loading in operation, is immobile relative to the surface of the main body.

The transverse bar is preferably a so-called opening bar and preferably at at least one of its longitudinal ends, can have a connecting region adapted for releasable fixing to a respective one of the side plates.

At least one connecting region can be provided for example for pivotable mounting of the transverse bar to a respective one of the side plates so that the receiving space in the chain link is accessible without removing the transverse bar from the chain link.

The invention further concerns a chain link for an energy guiding chain including two side plates which are connected together by transverse bars and which can be pivotably connected to side plates of further chain links in a longitudinal direction, wherein the chain link has at least one transverse bar with the line-protecting layer according to one of the above-described embodiments.

The invention also concerns an energy guiding chain for dynamically guiding lines like for example cables and/or hoses including at least one such chain link. The energy guiding chain preferably substantially comprises such chain links, particularly preferably all chain links between the end links of the energy guiding chain respectively include at least one transverse bar with a line-protecting layer in accordance with one of the foregoing embodiments.

BRIEF DESCRIPTION OF THE DRAWINGS

Further details, features and advantages of the invention will be apparent from the more detailed description hereinafter of preferred embodiments by way of example with reference to the accompanying Figures. Purely by way of example in the Figures:

FIGS. 4A-4B show a further embodiment of a transverse bar in cross-section (FIG. 4A) and as a perspective view (FIG. 4B) with a line-protecting layer according to the invention, which is provided as a separate attachment portion; and FIGS. 5A-5B show yet a further embodiment of a transverse bar in cross-section (FIG. 5A) and as a perspective view (FIG. 5B) with a line-protecting layer according to the invention, which is provided as a separate attachment portion.

DETAILED DESCRIPTION

Figure 1:
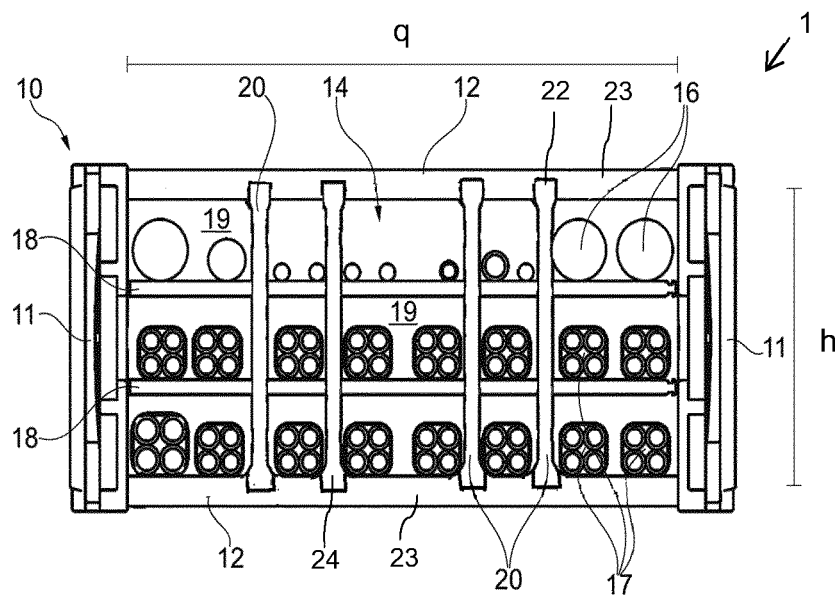
FIG. 1 shows a cross-section of a chain link of an energy guiding chain equipped by way of example with lines and an internal division.

FIG. 1 shows a cross-sectional view perpendicularly to the longitudinal direction of an energy guiding chain 1 through a chain link 10, an internal structure by way of example of the energy guiding chain 1 for actively guiding lines like for example cables 17 and hoses 16. The energy guiding chain 1 is composed of a multiplicity of mutually pivotably connected chain links 10 in a direction perpendicular to the plane of FIG. 1. Here the chain links 10 also comprise individual parts and have at least two side plates 11. In each or for example each second chain link 10 the side plates 11 are fixedly connected by two parallel identical transverse bars 12 to form a stable structure and are held at a spacing in the transverse direction of the energy guiding chain 1 and parallel. For that purpose, the transverse bars 12 are fixed releasably to the side plates 11 by means of end fixing regions, for example by means of clamping receiving means on horns (not shown) of the side plates 11. The side plates 11 and transverse bars 12 define a receiving space 14 for the lines 16, 17. The construction of an energy guiding chain 1 is known and can be of any desired structure, for example with cranked side plates or alternate internal and external plates constituting the side plates 11. In particular two-part chain links can also be considered, in which the two side plates 11 and a transverse bar 12 are produced from one piece, that is to say integrally, and only the other transverse bar 12 is releasable (this is not shown).

For the purposes of internal division it is known, as shown by way of example in FIG. 1, to provide horizontal transverse plate portions 18 for dividing the height h of the receiving space 14 and vertical separating bars 20 for dividing the width q of the receiving space 14. In the direction of the height h the separating bars 20 have two end regions, a head portion 22 and a foot portion 24, and at least at one of the end regions, for example at the foot portion 24, they can be fixed to the narrow sides 23 of the transverse bars 12 at selectable positions in the direction of the width q of the receiving space 14 or in the direction of the length of the transverse bar 12, for example by a latching connection. The transverse bars 12 are at any event secured in the longitudinal direction of the energy guiding chain 1 and in the direction of the width B of the transverse bar. The transverse plate portions are respectively to be fitted in horizontally continuous through openings 32 (see FIG. 2) which are provided in accordance with a predetermined pattern on the separating bars 20 and in selectable steps in respect of the height h. In that respect FIG. 1 shows transverse plate portions 18 in the form of insertion plate portions which extend almost completely over the width q. Shorter shelf plate portions which divide only a part of the width q are also possible. The separating bars 20 are of a plate-like or flat configuration and extend with their main plane or longitudinal direction parallel to the side plates 11. The transverse portions 18 are also of a plate-like configuration and extend parallel to the transverse bars 12. For each chain link 10 with transverse bars 12, a similar internal division of the receiving space 14 is to be provided for the benefit of the lines 16, 17. Separating bars 20 and transverse plate portions 18 are therefore to be provided at regular spacings and in an identical arrangement at each n-th chain link in order to divide the receiving space 14 into compartments or partitions 19 for orderly guidance of the lines 16, 17 with better protection for same.

Figure 2A:
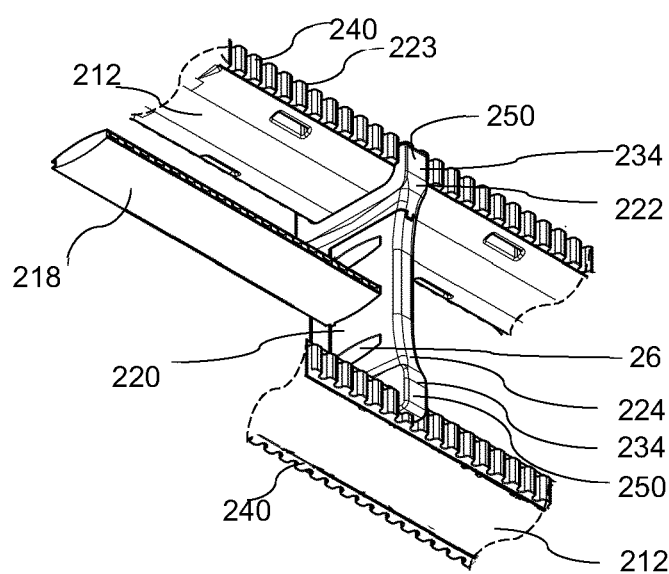
FIGS. 2A-C show a partial view of a chain link according to an embodiment as a perspective view (FIG. 2A), as a cross-section through the main plane of the transverse bottom portion (FIG. 2B) and from below (FIG. 2C)
Figure 2B:
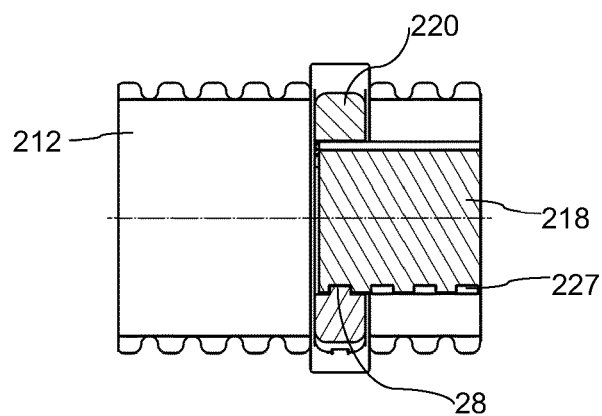
Figure 2C:
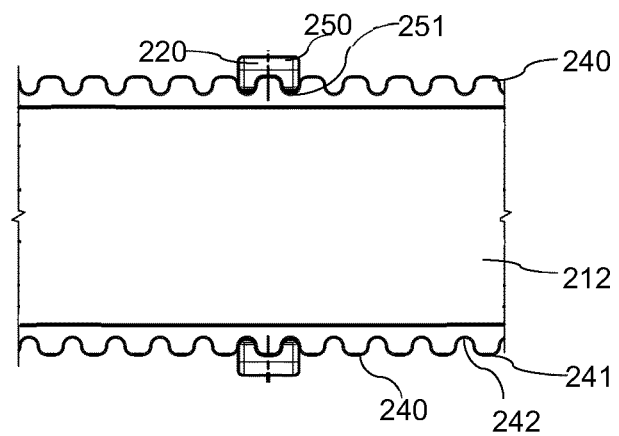

FIGS. 2A-2C show an embodiment of the internal division of a chain link 10 as a view of part thereof. At the head part 222 and the foot part 224 the separating bar 220 has a respective holding clip 234. In this case the holding clips 234 at the head and foot parts 222, 224 are of an identical configuration. As FIG. 2A shows the separating bar 220 is fitted between two identical transverse bars 212, wherein the holding clips 234 respectively hold at the head and foot parts of the separating bar to the narrow sides 223 of the transverse bars.

Each transverse bar 212 is of an elongate and plate-like configuration and in the illustrated example at its two longer narrow sides 223 has a respective tooth strip or strip-like row of teeth 240 designed for positively locking connection to separating bars 220 of a complementary configuration.

As can best be seen from FIG. 2C the external contour of the narrow sides 223 respectively forms a row of teeth 240 with teeth 241 which project outwardly in the width direction B of the transverse bar 212 and are spaced from each other by tooth gaps 242. A multiplicity of teeth 241 and tooth gaps 242 of identical configuration are provided distributed alternately and uniformly along a predominant part of the longitudinal extent of the narrow sides 223. The teeth 241 and tooth gaps 242 respectively have at the ends a rounded profile. Each tooth 241 is of a dimension in the height direction H of the transverse bar 212, that is greater than its dimension in the longitudinal direction Q of the transverse bar 212, and is for example 7 mm. That dimension of the tooth 241 in the height direction H of the transverse bar 212 is also greater than the dimension of the tooth in the width direction B of the transverse bar 212. This provides a push-in connection which is smoothly operable and at the same time tilting-resistant.

The holding clip 234 in the direction of the width of the separating bar has two opposite holding extensions 250 which are designed for holding to the narrow sides 223 of a transverse bar 212 in complementary relationship with the rows of teeth 240. The spacing between the holding extensions 250 of a holding clip 234 relative to each other corresponds to the width of the transverse bar 212. In the illustrated embodiment the holding extensions 250 respectively have a pair of tooth projections 251. The tooth projections 251 are designed for positively locking insertion into the row of teeth 240, here in two respective successive tooth gaps 242. The end region of the holding extension 250 here for example is of a U-shaped cross-section.

The dimension of the tooth projections 251 in the direction of the width of the separating bar corresponds to the depth of the tooth gaps 242. The dimension of the tooth projections 351 in the height direction of the separating bar 20 in the illustrated embodiment is for example about 5 mm.

FIGS. 2A-2C further show a transverse portion 218 which is of a plate-like configuration and which is adapted in cross-section to the through opening 26 in the separating bar 220. The transverse portion 218 at one of its long narrow sides has a tooth arrangement 227 for co-operating with the latching projections 28 of the through opening 26.

Figure 3:
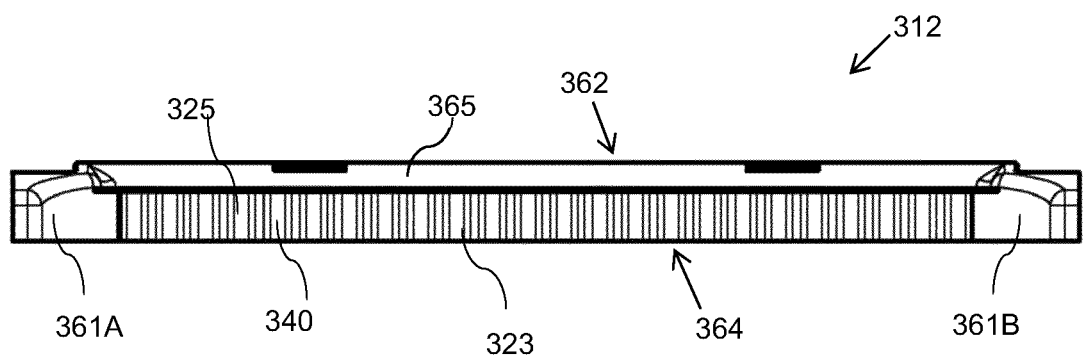
FIG. 3 shows an embodiment of a transverse bar or opening bar as an end view of a narrow side with a line-protecting layer according to the invention.

FIG. 3 shows a side view on the narrow sides of an embodiment of the transverse bar 312 which also has the two rows of teeth for a separating bar 220. In the case of the transverse bar 312 the elongate main body 325 is produced from a first plastic, for example a reinforced polyamide, in order to provide at each of its longitudinal ends robust connecting regions 361A, 361B, by means of which the transverse bar 312 is connected to the side plates 11. At the inside 362 of the main body 325, which is shown upwardly in FIG. 3 and which in the operative state (with a transverse bar fitted to the chain link 10) faces towards the receiving space 14 (see FIG. 1) the transverse bar 312 includes a line-protecting layer 365 for handling the lines gently, comprising a second plastic which is different from the plastic of the main body 325 and which is selected specifically for protecting the lines. The transverse bar 312 can be produced for example in the form of a two-component injection moulding. The line-protecting layer 365 covers the main body 325 over its full area continuously in the longitudinal direction Q of the transverse bar between the longitudinal ends and in the width direction B of the transverse bar from the one narrow side 323 to the other narrow side so that it is only at the ends that the tooth arrangement projects outwardly (see FIG. 2). Accordingly, the tooth arrangement remains accessible and is not covered by the line-protecting layer 365.

FIGS. 4A-4B and FIGS. 5A-5B show further embodiments of the transverse bar 412, 512, in which the line-protecting layer 465, 565 however is produced as a separate moulding. Here too the line-protecting layer 465, 565 can be produced from a material having friction-reducing properties using an injection moulding method, but it is releasably connected to the main body 425, 525. The main body 425, 525 is produced from a fibre-reinforced polyamide using an injection moulding method. In these examples the line-protecting layer 465, 565 is produced from a softer material with for example a lower Shore-D hardness than the material of the main body. Preferably for example a polyethylene (PE) or HMWPE, with PTFE as a sliding-improving additive and optionally with glass fibre reinforcement is used. The line-protecting layer can also be produced from UHMWPE with PTFE or with dispersed waxes and/or oils to improve tribological properties and optionally with additional reinforcement comprising glass balls, glass fibres, carbon fibres, aramid and/or other fillers. Those materials can also be used for producing the line-protecting layer according to the embodiment in FIG. 3.

As can be seen from FIGS. 4A-4B and FIGS. 5A-5B the line-protecting layer 465, 565 is fitted on one side on the main body 425, 525 of the transverse bar 412, 512, more specifically only at the inside 462, 562 of the main body 425, 525. The line-protecting layer 465, 565 extends substantially from one long narrow side 423, 523 to the other narrow side and from one longitudinal end of the main body to the other. The inside 462, 562 of the main body 425, 525 is thus very substantially covered or hidden by the line-protecting layer 465, 565. In that way it is possible to ensure that, when the transverse bar 412, 512 is appropriately fitted in a chain link 10 of an energy guiding chain 1 the guided lines come into contact with the line-protecting layer 465, 565 and not with the main body 425, 525.

FIGS. 4A-4B show an embodiment in which the transverse bar 412, as the holding device for holding separating bars, respectively comprises a holding groove 442 and a row of teeth 440 in the longitudinal groove 442 at each narrow side 423 which extends in the longitudinal direction Q of the transverse bar. The line-protecting layer 465 covers the inside of the main body but not the narrow sides 423 which remain uncovered so that the holding groove 442 and the row of teeth 440 are available for connection to separating bars over the entire length thereof. Optional separating bars for internal division of the chain link can thus be fixed at any desired position along the longitudinal extent of the transverse bar 412, on the transverse bar 412.

As shown in FIGS. 4A-4B the line-protecting layer 465 is fixed to the main body by a snap connection or a latching connection. The line-protecting layer 465 for that purpose has at least one projection 472 arranged centrally (with respect to the width direction B of the transverse bar 412). The projection 472 can be extended like a rib in the longitudinal direction Q of the transverse bar 412 or there can be distributed individual latching protrusions. The projection 472 has a doubled snap hook or barb 474 on both sides. The main body 425 in turn has a profile groove 470 or latching receiving means 470, the cross-section of which corresponds to that of the projection 472. To make the snap connection the line-protecting layer 465 can be pressed for example manually on to the inside 462 of the main body 425 in a direction transverse with respect to the main plane of the main body 425 so that the projection 472 latches with the snap hook 474 into the profile groove 470. Removal of the line-protecting layer 465 from the main body 425 is intended to require markedly more force. That ensures that in regular operation of the energy guiding chain 1 the line-protecting layer 465 cannot be detached from the main body 425 and is not displaced relative to the surface of the main body 425 although it is only fixed at the inside to the transverse bar 412. In an embodiment a profile groove 470 extends from one longitudinal end or short side of the main body 425 to the other and is open at the end to the short ends, so that the line-protecting layer 462 can also be pushed on to the main body 425 from the short ends so that with the layer 462 the projection 472 is pushed in the longitudinal direction Q of the transverse bar into the profile groove 470 in parallel relationship with the main plane of the main body. In that way removal of the line-protecting layer 462 from the main body 425, for example in the event of excessive wear, can be allowed only when the transverse bar 412 is in the state of being dismantled from the chain link 10. In that way the line-protecting layer 465 can be prevented from coming loose from or dropping off the main body 425 in usual operation, by virtue of the positively locking connection.

FIGS. 5A-5B show a further embodiment in which the transverse bar 512 has a respective row of teeth 540 on its main body 525 as a holding device for holding separating bars. Here the teeth project from the main plane of the main body 525 in the height direction H of the transverse bar 512. It is also possible for the teeth to project in the width direction B of the transverse bar as in FIGS. 3A-3C. In addition, along its long narrow sides 523 the main body 525 has a respective longitudinal groove 570 serving as a fixing region for fixing the line-protecting layer 565. Here the line-protecting layer 565 is of a bowl-like configuration and in turn has edge regions 572 which extend along its longitudinal extent and which as snap connection regions respectively co-operate with a respectively associated additional longitudinal groove 570 of the main body 525. The line-protecting layer 565 can be pressed manually on to the main body 525 from its inside 562 and snapped into place thereon. The edge regions 572 of the line-protecting layer 565 are respectively of a C-shaped cross-section transversely to the longitudinal extent so that, when the line-protecting layer 565 is snapped on to the main body, the respective edge region 572 engages into the corresponding longitudinal groove 570 and prevents the line-protecting layer 565 from slipping or falling off the main body 525 in operation of the energy guiding chain 1. In this example the line-protecting layer 565 lies closely and without any gap or in flush relationship against the inside 562 of the main body 525. The narrow sides 523 and the outside 564 of the main body 525 remain free or uncovered so that the rows of teeth 540 for connecting separating bars are available along the entire length thereof.

In the embodiments shown in FIGS. 4A-B and FIGS. 5A-5B a snap or latching connection is made between the snap or latching connection regions of the line-protecting layer 462, 562 and the corresponding fixing regions 470, 570 of the main body. For that purpose provided on the main body are fixing regions 470, spatially separated from the holding devices for the separating bars (row of teeth 440, holding groove 442). In that way all holding devices provided there are kept free for connection to separating bars.

Embodiments are however possible in which the transverse bar, at each narrow side of the main body, has a plurality of redundant holding devices for separating bars or both a groove and also a row of teeth or two parallel grooves extending in spaced relationship in the width direction B of the transverse bar, wherein a holding device is closer to the corresponding narrow side and extends along same. In that case the line-protecting layer can be fitted by a snapping action on to the main body in such a way that the grooves also co-operate as fixing regions with the snap connection regions of the line-connecting layer, in which case the rows of teeth or the grooves extending closer to the narrow sides are available for connection to the separating bars.

LIST OF REFERENCES

FIG. 1:
1 energy guiding chain
10 chain link
11 side plate
12 transverse bar
14 receiving space
16 hoses
17 cables
18 transverse portion
19 compartments of the receiving space
20 separating bar
22 head part of the separating bar
23 narrow side of the transverse bar
24 foot part of the separating bar
h height of the receiving space
q width of the receiving space
FIGS. 2A-C:
26 through opening in the separating bar
28 latching projection of the through opening
212 transverse bar
218 transverse portion
220 separating bar
222 head part of the separating bar
223 narrow side
224 foot part of the separating bar
227 tooth arrangement on the transverse portion
234 holding clip
240 row of teeth
241 tooth
242 tooth gap
250 holding extension
251 tooth projection
B width direction of the transverse bar
H height direction of the transverse bar
Q longitudinal direction of the transverse bar
FIG. 3:
312 transverse bar
323 narrow side
325 main body
340 row of teeth
362 inside
364 outside
365 line-protecting layer
361A, 361B connecting region
FIGS. 4A, B:
412 transverse bar
423 narrow side
425 main body
440 row of teeth
442 holding groove
462 inside
464 outside
465 line-protecting layer
470 profile groove
472 projection
474 barb
FIGS. 5A, B:
512 transverse bar
523 narrow side
525 main body
540 row of teeth
562 inside
564 outside
565 line-protecting layer
570 longitudinal groove
572 edge region of the line-protecting layer

What is claimed is:

1. A transverse bar for a chain link of an energy guiding chain for guiding lines, comprising:
wherein the chain link has two mutually spaced side plates, wherein the transverse bar has an elongate main body comprising a first plastic and at each of its longitudinal ends a connecting region, by means of which it can be connected to a respective one of the side plates to define a receiving space for lines, wherein the main body of the transverse bar has two narrow sides which are extended in the longitudinal direction of the transverse bar and which respectively have a holding device for holding separating bars, namely a holding device at the one narrow side and a holding device at the other narrow side, wherein provided on the inside of the main body which in the intended use faces towards the receiving space is a line-protecting layer for handling the lines gently comprising a second plastic different from the plastic of the main body for reducing abrasion upon relative movement between a line and the transverse bar; and the line-protecting layer extends from the one narrow side to the other narrow side of the main body and covers the inside of the main body between the narrow sides of the main body at least predominantly while leaving the two holding devices uncovered;

the line-protecting layer is produced in one piece with the main body in a two-component injection moulding process or is injected onto the main body.

2. The transverse bar according to claim 1, wherein the line-protecting layer extends in the longitudinal direction between the longitudinal ends and in the width direction from the one narrow side to the other narrow side and covers the inside of the main body substantially completely and continuously over the full area in the width direction and in the longitudinal direction.

3. The transverse bar according to claim 1, wherein the line-protecting layer is connected in material-bonded relationship to the main body.

4. The transverse bar according to claim 1, wherein the line-protecting layer is of a one-piece configuration with a surface which upon an intended operational loading is immobile relative to the surface of the main body.

5. The transverse bar according to claim 1, wherein each holding device has a respective row of teeth at the respective narrow side for positively locking connection to separating bars of a complementary configuration, with teeth projecting in the width direction of the transverse bar, and each tooth is of a dimension in the height direction of the transverse bar, that is larger than a dimension of the tooth in the longitudinal direction of the transverse bar.

6. The transverse bar according to claim 1, wherein each holding device includes a respective holding groove at the respective narrow side of the main body for positively locking connection to separating bars of a complementary configuration, the holding groove extending in the longitudinal direction of the transverse bar.

7. The transverse bar according to claim 1, wherein the line-protecting layer is provided only at the inside of the main body and between the narrow sides.

8. The transverse bar according to claim 1, wherein the line-protecting layer includes a material which in comparison with the main body has a wear-reducing action.

9. The transverse bar according to claim 1, wherein the line-protecting layer is of a material thickness in a direction perpendicular to the main plane of the transverse bar, that is less than the corresponding dimension of the main body.

10. The transverse bar according to claim 1, wherein at at least one of its longitudinal ends the transverse bar has a connecting region provided for releasable fixing to a respective one of the side plates.

11. The transverse bar according to claim 8, wherein the material, in comparison with the main body, has a friction-reducing action.

12. The transverse bar according to claim 9, wherein the material thickness of the line-protecting layer is less than or equal to 40% of the corresponding dimension of the main body.

* * * * *